(12) United States Patent
Walker

(10) Patent No.: US 6,510,413 B1
(45) Date of Patent: Jan. 21, 2003

(54) DISTRIBUTED SYNTHETIC SPEECH GENERATION

(75) Inventor: Mark R. Walker, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 09/605,885

(22) Filed: Jun. 29, 2000

(51) Int. Cl.$^7$ .............................................. G10L 21/06
(52) U.S. Cl. ........................ 704/258; 704/260; 704/270
(58) Field of Search ............................... 704/258, 260, 704/270, 272

(56) References Cited

U.S. PATENT DOCUMENTS

| | | | | |
|---|---|---|---|---|
| 5,572,625 A | * | 11/1996 | Raman et al. ............... | 704/260 |
| 5,911,129 A | * | 6/1999 | Towell ....................... | 704/272 |
| 5,915,237 A | * | 6/1999 | Boss et al. .................. | 704/258 |
| 5,933,805 A | * | 8/1999 | Boss et al. .................. | 704/249 |
| 6,085,161 A | * | 7/2000 | MacKenty et al. ........ | 704/270 |
| 6,101,470 A | * | 8/2000 | Eide et al. ................... | 704/260 |
| 6,163,794 A | * | 12/2000 | Lange et al. ................ | 709/202 |
| 6,226,606 B1 | * | 5/2001 | Acero et al. ................ | 704/218 |
| 6,226,614 B1 | * | 5/2001 | Mizuno et al. .............. | 704/260 |
| 6,233,550 B1 | * | 5/2001 | Gersho et al. .............. | 704/208 |
| 6,246,672 B1 | * | 6/2001 | Lumelsky ................... | 370/310 |
| 6,253,151 B1 | * | 6/2001 | Ohler et al. ................ | 701/208 |
| 6,289,304 B1 | * | 9/2001 | Grefenstette .................. | 704/9 |
| 6,314,367 B1 | * | 11/2001 | Ohler et al. ................ | 701/208 |

FOREIGN PATENT DOCUMENTS

WO    WO 99/66496    * 12/1999    ............ G10L/5/04

* cited by examiner

*Primary Examiner*—Susan McFadden
(74) *Attorney, Agent, or Firm*—Pillsbury Winthrop LLP

(57) ABSTRACT

Text that is to be synthesized into human speech is first converted into an intermediate form representation that describe the acoustic-prosodic resolution of the spoken version of the text. The intermediate form can be generated manually, or by an intermediate form generation program at a server computer, and later downloaded to client computers at their request. The client computers synthesize the intermediate form representation to audio for their users using a relatively simple speech rendering program.

30 Claims, 4 Drawing Sheets

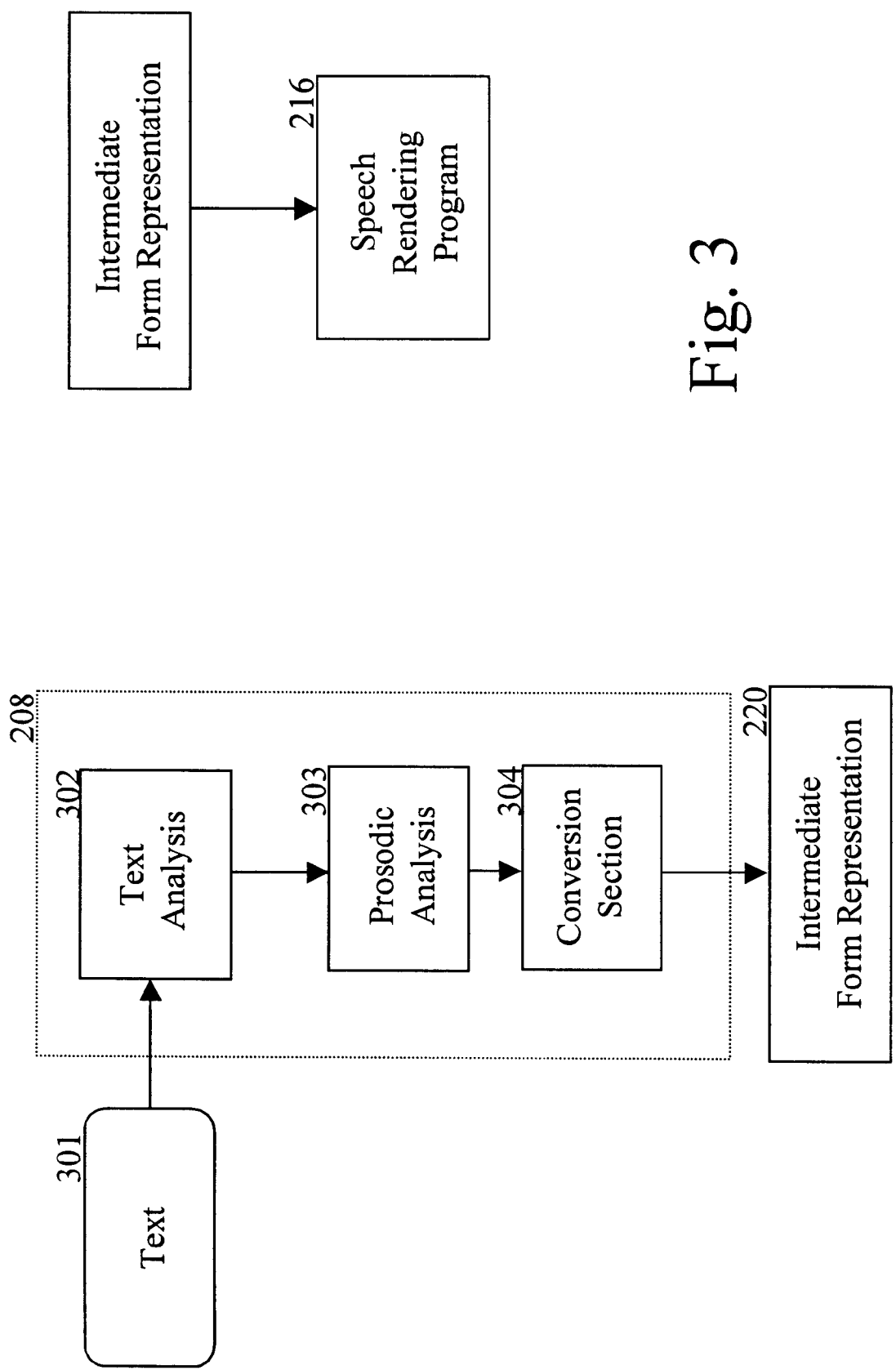

Fig. 4A

401 ⟨PH="pau" D=.21/⟩  402 ⟨PH="h" D=.0949/⟩  403 ⟨PH="&" D=.0581/⟩
404 ⟨PH="l" D=.0693/⟩  405 ⟨PH="oU" D=.2181/⟩

Fig. 4B

410 ⟨F0=103.5/⟩ ⟨F0=21.2/⟩ 411 ⟨F0=112.5 P=.075/⟩ 412 ⟨F0=113.2 P=.175/⟩ 413 ⟨F0=128.1 P=.28/⟩
401 ⟨PH="pau" D=.21/⟩ ⟨PH="h" D=.0949/⟩ 402 ⟨PH="&" D=.0581/⟩ 403 ⟨PH="l" D=.0693/⟩ 404
⟨PH="oU" D=.2181/⟩ 405

Fig. 4C

415 ⟨G=21.2/⟩ ⟨G=21.2/⟩ 416 ⟨G=23.4 P=.075/⟩ 417 ⟨G=24.7 P=.175/⟩ 418 ⟨G=24.7 P=.28/⟩
401 ⟨PH="pau" D=.21/⟩ ⟨PH="h" D=.0949/⟩ 402 ⟨PH="&" D=.0581/⟩ 403 ⟨PH="l" D=.0693/⟩ 404
⟨PH="oU" D=.2181/⟩ 405

Fig. 4D

420 ⟨T=.5/⟩ 421 ⟨T=.6 P=.075/⟩ ⟨T=.5 P=.175/⟩ 422 ⟨T=.6 P=.28/⟩ 423
401 ⟨PH="pau" D=.21/⟩ ⟨PH="h" D=.0949/⟩ 402 ⟨PH="&" D=.0581/⟩ 403 ⟨PH="l" D=.0693/⟩ 404
⟨PH="oU" D=.2181/⟩ 405

DISTRIBUTED SYNTHETIC SPEECH GENERATION

BACKGROUND OF THE INVENTION

1. Field of the Invention

The present invention relates generally to the generation of synthetic speech, and more specifically, to the generation of synthetic speech at remote client devices.

2. Description of Related Art

Speech synthesis, which refers to the artificial generation of speech from written text, is increasingly becoming an important technology for accessing information. Two areas in which speech synthesis looks particularly promising is in increasing the availability of information to sight-impaired individuals and in enriching the information content of web-based devices that have minimal or no viewing screens.

FIG. 1 is a diagram illustrating a conventional web-based speech synthesis system. Synthesizing text 101 into a digital waveform file 110 is performed by the three sequential steps of text analysis 102, prosodic analysis 103, and speech waveform generation 104.

In textual analysis, text 101 is analyzed into some form of linguistic representation. The analyzed text is next decomposed into sounds, more generally described as acoustic units. Most of the acoustic units for languages like English are obtained from a pronunciation dictionary. Other acoustic units corresponding to words not in the dictionary are generated by letter-to-sound rules for each language. The symbols representing acoustic units produced by the dictionary and letter-to-sound rules typically correspond to phonemes or syllables in a particular language.

Prosodic analysis 103 includes the identification of points within sentences that require changes in the intonation or pitch contour (up, down, flattening) and the defining of durations for certain syllabes. The pitch contour may be further refined by segmenting the current sentence into intonational phrases. Intonational phrases are sections of speech characterized by a distinctive pitch contour, which usually declines at the end of each phrase.

The speech waveform generation section 104 receives the acoustic sequence specification of the original sentence from the prosodic analysis section 103, and generates a human sounding digital audio waveform (waveform file 110). The speech waveform generation section 104 may generate an audible signal by employing a model of the vocal tract to produce a base waveform that is modulated according to the acoustic sequence specification to produce a digital audio waveform file. Another known method of generating an audible signal is through the concatenation of small portions of pre-recorded digital audio. These digital audio units are typically obtained by recording utterances from a human speaker. The series of concatenated units is then modulated according to the parameters of the acoustic sequence specification to produce an output digital audio waveform file. In most cases, the concatenated digital audio units will have a one-to-one correspondence to the acoustic units in the acoustic sequence specification. The resulting digital audio waveform file 110 may be rendered into audio by converting it into an analog signal, and then transmitting the analog signal to a speaker.

In the context of a web-based application, text 101 may be specifically designated by a web-page designer as text that viewers of the web site can hear as well as read. There are several methods that may be utilized to prepare a portion of web text for rendering into speech in the form a digital audio waveform. A human speaker may read aloud text into a collection of digital audio recordings. A remote client can then download and listen to the digital audio files corresponding to selected portions of the text. In another approach, a web-page author may elect to perform the steps of text analysis 102, prosodic analysis 103, and speech waveform generation 104, for each portion of text, producing a collection of digital audio files that could be stored on the web-server, and then transferred on request to the remote client.

An advantage of the above techniques is that rendering the binary speech waveform file 110 into audio at the client is a simple process that requires very little client resources. The digital audio files can be rendered into audio on web-access devices possessing minimal amounts of computer memory and little if any computational power. A disadvantage, however, is that digital audio files corresponding to speech waveforms 110 tend to be large files that require a lot of network bandwidth. This can be particularly problematic for clients connected to network 115 using a relatively slow connection such as a dial-up modem or a wireless cell-modem connection.

Another conventional speech synthesis technique for generating synthesized speech at a client computer is implemented using a process similar to that shown in FIG. 1, with the exception that text analysis section 102, prosodic analysis section 103, and speech waveform generation section 104 are all located locally at the client. In operation, text 101 is transmitted over the network to the client, and all the speech synthesis steps are then performed locally. A problem associated with this method of speech synthesis is that it can be computationally burdensome to the client. Additionally, programs for performing textual analysis, prosodic analysis, and speech waveform generation may be large programs containing extensive look-up dictionaries. Such programs are not suitable for web-terminals or for small portable browsers such as those incorporated into cellular phones or personal digital assistant (PDA) devices.

Accordingly, there is a need in the art to be able to efficiently deliver and synthesize speech at client devices, especially when the client devices have limited processing ability and low bandwidth connections.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings:

FIG. 3 is a diagram illustrating components in an embodiment consistent with the present invention; and FIGS. 4A–4D are examples of an intermediate form representation of a text file.

DETAILED DESCRIPTION

The following detailed description refers to the accompanying drawings that illustrate the embodiments of the present invention. Other embodiments are possible and modifications may be made to the embodiments without departing form the spirit and scope of the invention. Therefore, the following detailed description is not meant to limit the invention. Rather the scope of the invention is defined by the appended claims.

As described herein, textual information is converted into an intermediate format that is a pronunciation-resolved, re-representation of the text. When used in the context of a web page, the intermediate format may be stored at the web server and transmitted to a user whenever the user requests an audio version of the textual information. The intermediate format is significantly smaller than a digital waveform file representing the corresponding synthesized speech, but yet can be interpreted by a relatively small and computationally non-burdensome software program residing on a client computing device.

Figure 1:
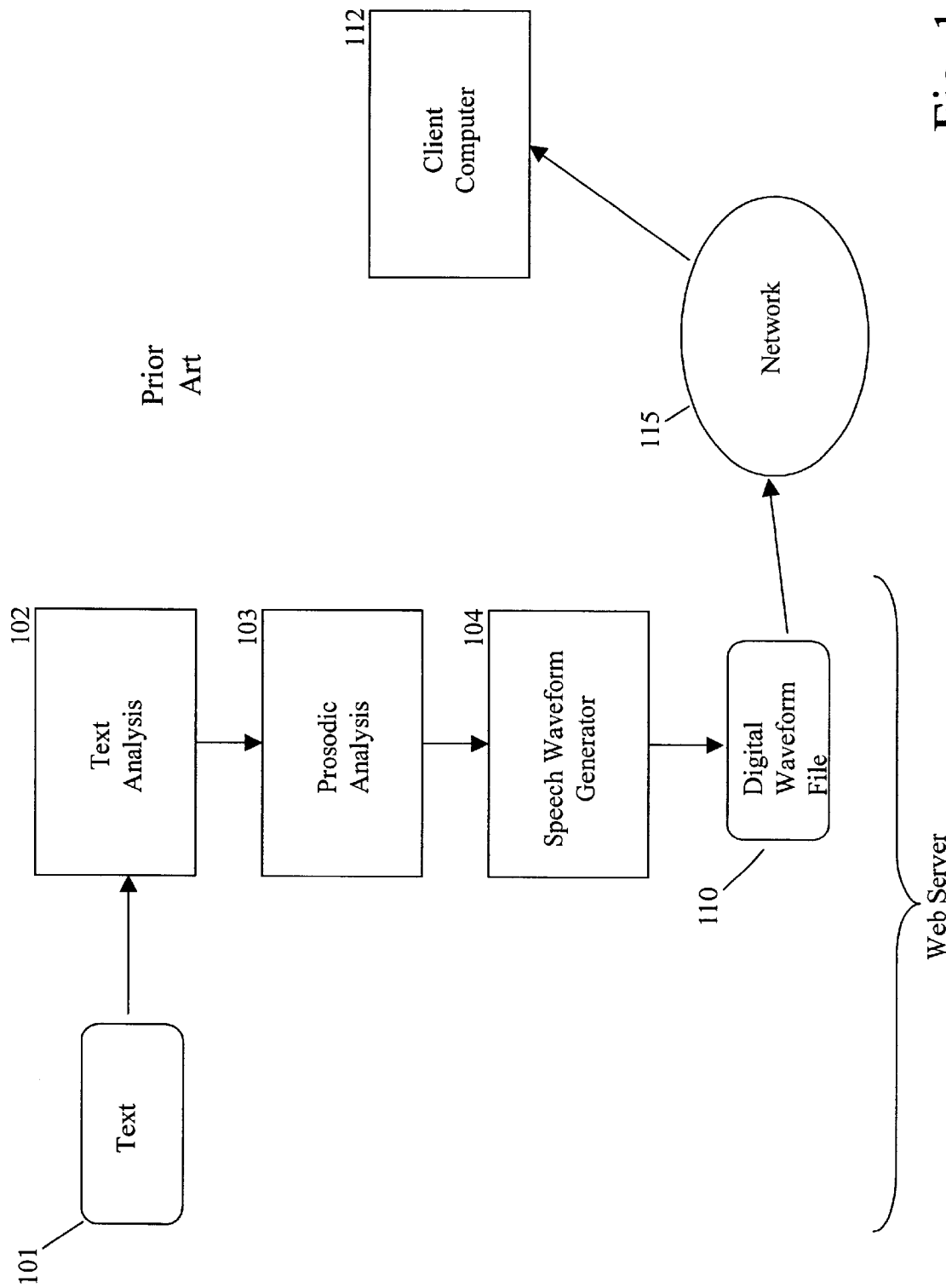
FIG. 1 is diagram illustrating conventional automated speech synthesis based on a text file.
Figure 2:
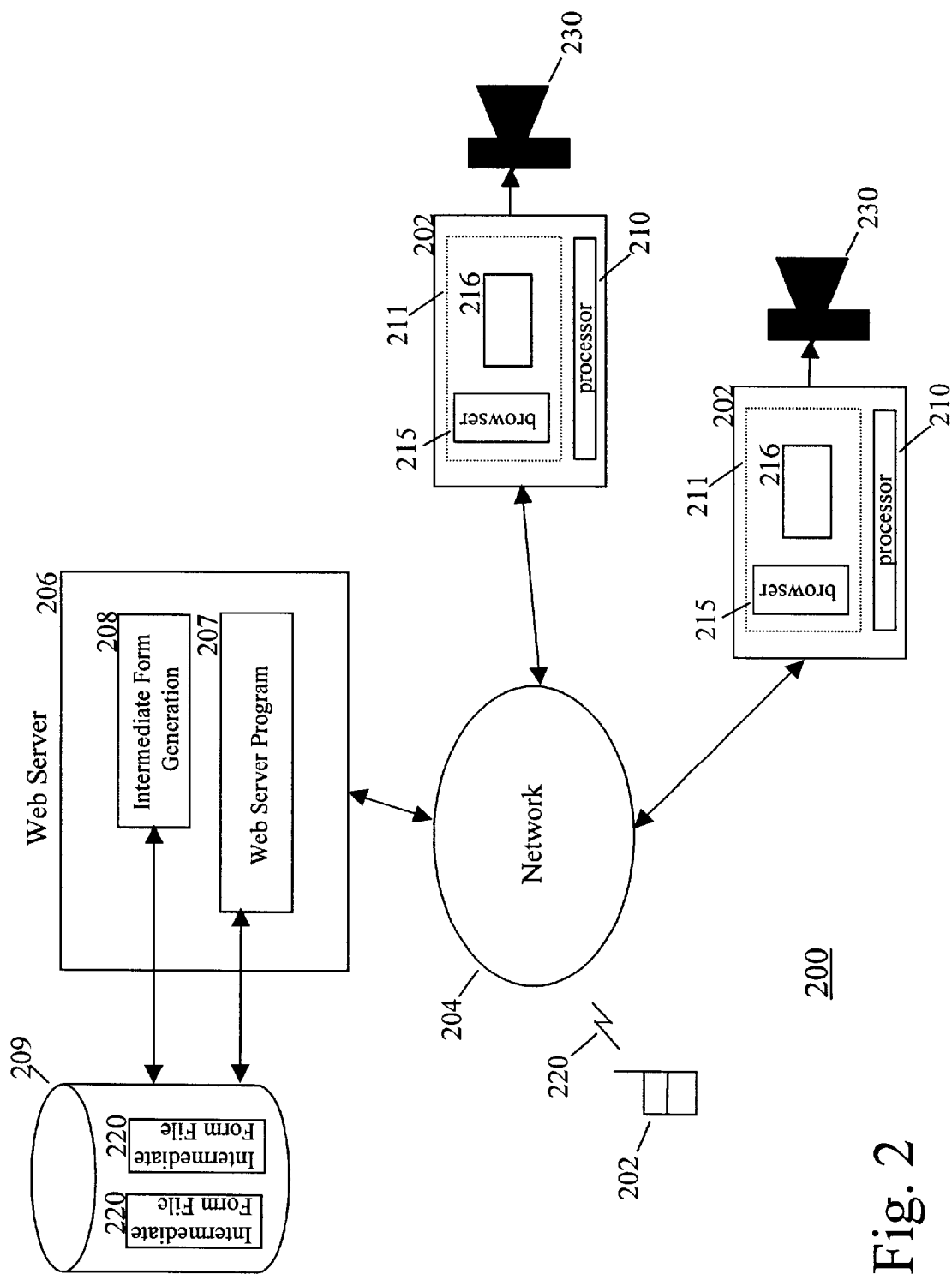
FIG. 2 is a diagram of a computer network on which concepts consistent with the present invention may be implemented.

FIG. 2 is a diagram of a computer network on which concepts consistent with the present invention may be implemented. The computer network includes one or more client computers 202 coupled to network 204, which may be, for example, the Internet. Client computers 202 each typically include a processor 210 operatively coupled to computer memory 211. Processor 210 executes program instructions stored in computer memory 211, such as a web browser program 215. Information interpreted by browser 215 may be displayed by processor 210 on a display.

Client computers 202, as well as being traditional personal computers, such as computers based on processors from Intel Corporation, of Santa Clara, Calif., can also be personal digital assistants, "smart" cellular phones, or pagers, connected through a wireless connection 220. In general, client computers 202 can be any type of computer platform connected in some manner to the network 204 and that allows users to interact with web server 206.

Client computers 202, by virtue of their connection to network 204, may access and retrieve information stored at other computers coupled to network 204. Web server 206 is a computer, or a network of computers, designed to accept information requests from client computers 202 and to transmit requested content back to the client computer. More specifically, client computers 202 contact web server 206 using a protocol such as the well-known hyper-text transfer protocol (HTTP). In response, web server 206 assembles the information requested by the contacting client computer and then transmits the requested information to the client computer. The information may be assembled in any format understandable to the browser, such as the HTML (hyper-text markup language) or XML (extensible markup language) formats.

Web server 206 is connected to a file system or database 209 and to network 204. Database/file system 209 stores information used by web server 206 to assemble web pages. Database/file system 209 is optional, as web server 206 may operate using information stored in memory local to web server 206.

Web server 206 includes a web page serving program 207 and an intermediate form generation program 208. Web page serving program 207 may be any one of a number of well known web servers such as the Apache web server, the Netscape server, available from Netscape Communication Corporation, of Mountain View, Calif.; or the Microsoft Internet Information Server, available from Microsoft Corporation, of Redmond, Wash.

Conventionally, in operation, web serving program 207, in response to HTTP requests from clients 202, retrieves information necessary to fulfill the request from database/file system 209 and assemblies the requested information into an appropriate web document. The document is then transmitted to the requesting client computer 202 where it is assembled and displayed. In accordance with an aspect of the present invention, documents transmitted to clients 202 may also include an intermediate form representation that represents synthetic speech. The intermediate from representation is audibilized by clients 202.

Client computers 202 and web server 206 may either accept program instructions from a computer storage device (e.g., optical or magnetic disk) or from network 204. BIOS code (i.e., computer instructions) causing the system to implement the disclosed techniques may be programmed into a non-volatile portion of computer memory 211. The BIOS may be programmed when the system is manufactured or may be later delivered via a computer readable medium.

As previously discussed, web server program 207, at the request of client 202, transmits information to browsers 215 at clients 202. Textual information transmitted from web server 206 may be displayed for visual interpretation by user's of client computers 202 executing software programs referred to as network browser programs. Consistent with an aspect of the present invention, this textual information may also be converted by intermediate form generation program 208 into an intermediate form representation, shown as intermediate form files 220, stored in database 209. The intermediate form representation may alternately be manually generated. The intermediate form representation is composed of a time-sequence of symbols, corresponding to basic speech sounds and additional symbols for modulating those basic sounds, with the result that when the time-sequence of symbols is applied as input to a speech waveform rendering program 216, a digital audio waveform is produced that sounds like a human reading the corresponding text. At the request of client computers 202, the intermediate form files 220 are transmitted to client computers 202, rendered into audio by speech waveform rendering program 216, and broadcast by speakers 230. Speech rendering program 216 may exist separately from browser 215 or may be a component or plug-in for browser 215.

The time-sequence of symbols composing the intermediate form representation 220 may be transmitted to a speech waveform rendering module on a client computing device 216 in the form of streaming text. In this situation, the audio can begin to be audibilized to the user before file 220 has been completely transferred.

Intermediate form generation program 208, intermediate form files 220, and speech rendering program 216 will now be described in more detail.

FIG. 3 is a conceptual diagram illustrating the interrelation of the intermediate form generation program 208, intermediate form files 220, and speech rendering program 216. As shown, intermediate form generation program 208 includes text analysis section 302, prosodic analysis section 303, and conversion section 304. Textual analysis section 302 and prosodic analysis section 303 perform textual analysis and prosodic analysis in the conventional manner (e.g., as performed by textual analysis section 101 and prosodic analysis section 103). During textual analysis by section 302, the text is analyzed such that regular words, abbreviations, and other special words are detected. More particularly, "chunks" of input data, typically corresponding to a sentence, are designated for processing. The chunks are then divided, or "tokenized" into regular words, abbreviations, and other special alpha-numeric strings using white spaces and punctuation cues. Each word may then be categorized into its parts-of-speech designation.

Prosodic analysis section 303 next decomposes the analyzed text into phonemes and resolves punctuation effects. Punctuation effects are resolved using known models of intonation and models of acoustic duration. The duration of individual phonemes are also determined, as well as additional intonation refinement.

Conversion section 304 converts the output of the prosodic analysis section 303 into intermediate form representation 220. The intermediate form representation 220 is highly compact, textual in nature, and is composed of a time-sequence of symbols, corresponding to discrete, basic speech sounds (acoustic units) and additional symbols that describe the modulation of those basic sounds (prosodic modifiers), with the result that when the time-sequence of symbols is applied as input to a speech waveform rendering program 216, a digital audio waveform is produced corresponding to the original text 301. Stated in another manner, the intermediate form representation represents, in a high-level manner, the continuous audio sequence that would be produced by the vocal tract of a human speaker reading aloud a portion of text 301.

Alternatively, instead of automatically generating intermediate form representation 220 using program 208, intermediate form representation 220 could be produced manually. Speech synthesis experts knowledgeable in the art could use a table of text-to acoustic unit correspondence to manually produce the basic acoustic unit descriptors, and then alter the resulting information form code by manually adding prosodic modifier descriptors. The result would similarly be applied to a speech waveform rendering program to produce an audio sequence that reproduces the effect of human reading aloud a portion of text 301

The implementation of intermediate form representation 220, produced by intermediate form generation program 208, will now be described in additional detail.

Intermediate form representation 220 is a compact, textual, symbolic representation of an acoustic-prosodic speech sequence. Representation 220 is structured from two fundamental elements: acoustic units and prosodic modifier units. Acoustic units specify individual, vocally produced sounds that are the audible basis for a given language. Acoustic units may represent phonemes, diphones, triphones, syllables, or even longer portions of speech. Thus the acoustical complexity of each acoustic unit may vary. When associated with a time duration, each acoustic unit may be interpreted as a partial description of a longer speech waveform. A sequencer of acoustic units can partially describe a speech waveform progression corresponding to some finite amount of intelligible speech, such as a word, phrase, or sentence.

Acoustic units, themselves, do not provide enough information to realistically synthesize human speech. That is, acoustic unit sequences that are associated with a portion of text only partially describe the basic, vocally-pronounced audio sequence that is generated by a human when the text is read aloud. If a default time sequence is associated with each acoustic unit, the resulting audio sequence will be basically intelligible but extremely "robot" like. In order to produce more realistic and natural sounding speech, prosodic modification information may be specified to accompany the acoustic units. The prosodic modification information reflects at least some of the natural qualities associated with speech produced by human speakers.

Prosodic modification units composing part of intermediate form representation 220 represent natural speech characteristics that are superimposed on the sequence of acoustic units. The prosodic units specify "target" modification values of the acoustic unit sequence. Speech rendering program 216, however, may interpolate additional target values between successive prosodic modification units to obtain a higher density of prosodic specification values, with the goal of generating an even more natural sounding speech output.

One possible implementation for the prosodic modification information users four different types of prosodic modifications units. To wit:

a. Duration Modification Descriptor Unit

A duration modification descriptor specifies both the identity of the acoustic unit and the duration of that acoustic unit. The descriptor of duration could be implemented as an absolute duration target value (e.g., a certain number of seconds) or it could describe a relative speeding-up or slowing-down or some default acoustic unit duration value.

b. Fundamental Pitch Frequency Modification Descriptor Unit

A fundamental pitch frequency modification descriptor modifies the fundamental pitch frequency used to produce an acoustic unit. Target frequency values could consist of absolute frequency values, or frequency targets that are relative with respect to some base frequency value. Specifying a series of target frequency values and their time positions within the acoustic unit sequence effectively superimposes an intonation contour on the acoustic unit sequence. For example, the rising of pitch at the end of a sentence commonly associated with a spoken question. The target frequency values may be placed sparsely within the acoustic unit sequence, representing only the critical information points of the intonation contour. The speech waveform generator receiving the acoustic sequence specification as input may elect to interpolate additional frequency targets between specified frequency points.

Acoustic unit duration and fundamental frequency pitch are the more significant of the four prosodic modification descriptor units when generating natural sounding synthesized speech.

c. Acoustic Gain Modification Descriptor Unit

A gain modification descriptor unit may be used to produce a more natural sounding audio sequence. The descriptor unit includes a target gain that includes an amplitude gain that should be applied to a corresponding acoustic unit(s). Target gain values could consist of absolute gain values in decibels (dB), or gain targets that are relative with respect to some base gain value.

d. Spectral Tilt Modification Descriptor Unit

A spectral tilt modification descriptor unit modifies the slope of the spectral envelope created by the acoustic units. The slope of the format spectral envelope is associated with vocal "effort" expended in uttering a given portion of speech. Target spectral tilt values could consist of floating point values corresponding to the linear slope of the format spectral envelope, or linear slope target values that are relative with respect to some base slope value. Specifying a series of target formant spectral envelope slope values and their time positions within the acoustic unit sequence effectively superimposes a vocalization effort contour on the acoustic unit sequence.

FIGS. 4A–D illustrate examples of an intermediate form representation comprising acoustic and prosodic modification descriptor units. In this example, the descriptor units are embodied as XML-like tags delimited by "<" and ">" symbols. XML is a well known markup language that allows for the flexible creation of data structures that describe the content of the data.

FIG. 4A illustrates an intermediate form representation the word "hello". The intermediate form representation includes acoustic descriptor units (corresponding in this example to individual English phonemes) that also contain the duration modification descriptors. A general, XML-like embodiment of the acoustic unit descriptor tags 401–405 is <PH=phoneID D=timeDuration|>, where the term "PH=" indicates that the acoustic unit corresponds to a phoneme in a given language, followed by a label phoneID that uniquely identifies the phoneme. Worldbet is a currently popular phoneme identification scheme that associates unique labels with all phonemes of all the worlds major languages. Following the acoustic unit identifier, the term "D=" indicates that the value following the "=" sign, timeDuration, is a time duration modification descriptor. In this example, the phoneme durations are specified in seconds. The five XML-like tags labeled 401–405 thus specify the example base acoustic sequence corresponding to the word "hello" as five phonemes ("pau," "h," "%," "l," and "oU"), that are each to be successively converted into sounds that will persist for the indicated periods (i.e., 0.21, 0.0949, 0.0581, 0.0693, and 0.2181 seconds, respectively).

FIG. 4B illustrates the intermediate form representation of FIG. 4A, but additionally includes fundamental pitch frequency modification descriptor units. Tags 410, 411, 412, and 413 specify the target frequency of the fundamental pitch and the temporal location for each target frequency value. A general, XML-like form of the fundamental frequency modification tags 410–413 is: <F0=f0Val P=timePosition|>. The term "F0=" indicates that the value f0Val specifies a target frequency for the fundamental pitch in hertz. Following the target pitch frequency value, the optional term "P=" indicates that the value timePosition specifies the point in time within the acoustic sequence that the target frequency is to be applied. Specifying P relative to the previous F0 target tag may allow increased precision and compactness of the representation. For silences or pauses that are specifically designated as intonation contour termination/beginning points, we may somewhat decrease the amount of memory required to store a given intermediate form document by allowing the timePosition location of the first pitch target value following a pause to default to the beginning of the first non-silent acoustic unit. Thus the first pitch target tag following a pause is not required to have a P value specified.

In the example shown in FIG. 4B, tag 410 sets the target frequency of the fundamental pitch at the onset of the acoustic unit in tag 401 as 103.5 hertz. Tag 411 sets the target frequency of the signal 0.75 seconds after the onset of acoustic unit tag 401. Similarly, tag 412 sets the target frequency of the signal 0.175 seconds after the target frequency set by tag 411 and tag 413 sets the target frequency of the signal 0.28 seconds after the target frequency set by tag 412.

FIG. 4C illustrates the intermediate form representation of FIG. 4A but additionally includes acoustic gain modification descriptor units. Tags 415, 416, 417, and 418 are structurally similar to the fundamental pitch frequency tags, except that the "F0" terms are replaced with "G" terms (indicating a gain descriptor unit). The general specification for the acoustic gain modification tags 415–418 is: <G=gainVal P=timePosition|>. Here, G=gainVal is a value specifying in dB the target gain at P=timePosition, a quantity specifying the time in seconds within the acoustic sequence where the gain is to be applied. As with pitch target values above, P may be more conveniently specified relative to the previous G target tag. And as with pitch target values, if P is not specified, the G target following a pause may be more conveniently assumed to be associated with the beginning of the first non-silent acoustic unit.

As shown in FIG. 4C, tag 415 set the target gain at the onset of the acoustic unit in tag 401 to 21.2 dB. Tag 416 sets the target gain of the signal 0.75. seconds after the onset of acoustic unit tag 401 to 21.2 dB. Similarly, tag 417 sets the target frequency of the signal 0.175 seconds after the target frequency set by tag 416 and tag 418 sets the target frequency of the signal 0.28 seconds after the target frequency set by tag 417.

FIG. 4D illustrates the intermediate form representation of FIG. 4A, but additionally includes spectral tilt descriptor units. Tags 420, 421, 422, and 423 are structurally similar to the fundamental pitch frequency tags gain modification tags, with "T" being used to indicate a spectral tilt descriptor unit. Spectral tilt refers to the slope of the short-term voice spectral envelope, and is generally associated with vocal effort and emphasis. The general specification for the target slope of the spectral tilt modification tags 420–423 is: <T=tiltVal P=timePosition|>. Here, T=tiltVal is a value specifying the target slope of the format spectral envelope at P=timePosition, specified in seconds. As with pitch target values above, P may be more conveniently specified relative to the previous T target tag. And as with pitch target values, if P is not specified, the T target location following a pause may be more conveniently assumed to be associated with the beginning of the first non-silent acoustic unit.

As shown in FIG. 4D, tag 420 sets the target slope of the formant spectral envelope at the onset of the acoustic unit in tag 401 to 0.5. Tag 421 sets the target slope of the signal 0.75 seconds after the onset of acoustic unit tag 401 to 0.6. Similarly, tag 422 sets the target frequency of the signal 0.175 seconds after the target frequency set by tag 421 and tag 423 sets the target slope of the signal 0.28 seconds after the target slope set by tag 422.

Speech waveform rendering program 216 residing in client 202, synthesizes audio based on the textual intermediate form document 220. Synthesizers for producing speech based on fundamental acoustic sounds and prosodic modifiers are known in the art and thus will not be described further.

As described herein, an intermediate form representation of human speech is used to partially remove the computer resource intensive task of synthesizing speech from normal text away from the client device. The intermediate form representation is synthesized by the client into speech using a simple and compact rendering program. In this manner, audio information in the form of speech can be transmitted to devices such as portable wireless devices in a simple and highly compact form, as the intermediate form representation is smaller than the corresponding digitized version of the audio signal.

It will be apparent to one of ordinary skill in the art that the embodiment as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of synthesizing speech comprising:
receiving an intermediate form representation of a text file, the intermediate form representation containing a pronunciation-resolved re-representation of the text file, the intermediate form representation including acoustic units that represent individual vocal sounds sequences and prosodic modifiers that specify modifications of the vocal sounds represented by the acoustic units;
rendering the intermediate form representation into an audio signal based on the acoustic units and prosodic modifiers; and
transmitting the audio signal to a speaker.

2. The method of claim 1, wherein the intermediate form representation of the text file is received as a streaming file and rendering the intermediate form representation into the audio signal is started before the intermediate form representation has been fully received.

3. The method of claim 1, wherein the intermediate form representation is contained in a series of extensible markup language (XML) tags.

4. The method of claim 1, wherein the prosodic modifiers include at least one of fundamental pitch modification descriptor units, duration modification descriptor units, acoustic gain modification descriptor units, and spectral tilt modification descriptor units.

5. A data structure stored on a computer readable medium and that describes a pronunciation-resolved representation of a text file, the data structure comprising:
a plurality of acoustic units, each acoustic unit representing a vocally produced sound sequence;
duration modification descriptor units, each of the duration modification descriptor units corresponding to or contained within at least one of the plurality of acoustic units and specifying a time duration of the corresponding acoustic unit; and
fundamental pitch modification descriptor units, each of the fundamental pitch modification descriptor units corresponding to at least one of the plurality of acoustic units and specifying a target frequency of a fundamental pitch used to produce the acoustic unit.

6. The data structure of claim 5, further comprising:
acoustic gain modification descriptor units, each of the acoustic gain modification descriptor units corresponding to the at least one of the plurality of acoustic units and specifying an amplitude gain that is to be applied to the corresponding acoustic unit.

7. The data structure of claim 6, further comprising:
spectral tilt modification descriptor units, each of the spectral tilt modification descriptor units corresponding to the at least one of the plurality of acoustic units and specifying a target slope of a formant spectral envelope of the corresponding acoustic unit.

8. The data structure of claim 5, wherein the acoustic units and the duration modification units are contained in a series of extensible markup language (XML) tags.

9. The data structure of claim 5, wherein the acoustic units are phonemes.

10. A method of enabling a remote client device to synthesize speech, the method comprising:
receiving a text file;
separating the text file into a series of acoustic units that represent individual vocal sounds;
associating duration modification descriptor units with the acoustic units, each of the duration modification descriptor units corresponding to at least one of the plurality of acoustic units and specifying a time duration of the corresponding acoustic unit; and
transmitting the acoustic units and the associated duration modification descriptor units to the remote client device.

11. The method of claim 10, further comprising:
associating fundamental pitch modification units with the acoustic units, each of the fundamental pitch modification descriptor units corresponding to at least one of the plurality of acoustic units and specifying a target frequency of a fundamental pitch used to produce the acoustic unit.

12. The method of claim 10, further comprising:
associating acoustic gain modification descriptor units with the acoustic units, each of the acoustic gain modification descriptor units corresponding to the at least one of the plurality of acoustic units and specifying an amplitude gain that is to be applied to the corresponding acoustic unit.

13. The method of claim 10, further comprising:
associating spectral tilt modification descriptor units with the acoustic units, each of the spectral tilt modification descriptor units corresponding to the at least one of the plurality of acoustic units and specifying a target slope of a formant spectral envelope of the corresponding acoustic unit.

14. The method of claim 10, wherein the acoustic units and the duration modification units are contained in a series of extensible markup language (XML) tags.

15. The method of claim 10, wherein the acoustic units are phonemes.

16. A computer readable medium containing computer instructions that when executed by a processor cause the processor to synthesize speech, the speech synthesis comprising:
receiving an intermediate form representation of a text file, the intermediate form representation containing a pronunciation-resolved re-representation of the text file, the intermediate form representation including acoustic units that represent individual vocal sounds and prosodic modifiers that specify modifications of the vocal sounds represented by the acoustic units;
rendering the intermediate form representation into an audio signal based on the acoustic units and prosodic modifiers; and
transmitting the audio signal to a speaker.

17. The computer readable medium of claim 16, wherein the intermediate form representation of the text file is received as a streaming file and rendering the intermediate form representation into the audio signal is started before the intermediate form representation has been fully received.

18. The computer readable medium of claim 16, wherein the intermediate form representation is contained in a series of extensible markup language (XML) tags.

19. The computer readable medium of claim 16, wherein the prosodic modifiers include at least one of fundamental pitch modification descriptor units, duration modification descriptor units, acoustic gain modification descriptor units, and spectral tilt modification descriptor units.

20. A computer readable medium containing computer instructions that when executed by a processor cause the processor to perform acts enabling a remote client device to synthesize speech, comprising:

receiving a text file;

separating the text file into a series of acoustic units that represent individual vocal sounds;

associating duration modification descriptor units with the acoustic units, each of the duration modification descriptor unit corresponding to at least one of the plurality of acoustic units and specifying a time duration of the corresponding acoustic unit; and transmitting the acoustic units and the associated duration modification descriptor units to the remote client device.

21. The computer readable medium of claim 20, further including instructions that cause the processor to perform acts comprising:

associating fundamental pitch modification units with the acoustic units, each of the fundamental pitch modification descriptor units corresponding to at least one of the plurality of acoustic units and specifying a target frequency of a fundamental pitch used to produce the acoustic unit.

22. The computer readable medium of claim 20, further including instructions that cause the processor to perform acts comprising:

associating acoustic gain modification descriptor units with the acoustic units, each of the acoustic gain modification descriptor units corresponding to the at least one of the plurality of acoustic units and specifying an amplitude gain that is to be applied to the corresponding acoustic unit.

23. The computer readable medium of claim 20, further including instructions that cause the processor to perform acts comprising:

associating spectral tilt modification descriptor units with the acoustic units, each of the spectral tilt modification descriptor units corresponding to the at least one of the plurality of acoustic units and specifying a target slope of a format spectral envelope of the corresponding acoustic unit.

24. The computer readable medium of claim 20, wherein the acoustic units and the duration modification units are contained in a series of extensible markup language (XML) tags.

25. The computer readable medium of claim 20, wherein the acoustic units are phonemes.

26. A computing device comprising:

a processor;

a computer memory coupled to the processor, the computer memory including a speech rendering program, the speech rendering program configured to receive a pronunciation resolved intermediate from representation of a text file that is to be converted into speech, the speech rendering program converting the pronunciation resolved intermediate representation into a digital audio file; and a speaker coupled to the computer memory, the speaker receiving and playing the audio file.

27. The computing device of claim 26, wherein the intermediate form representation includes:

a plurality of acoustic units, each acoustic unit representing a vocally produced sound; and duration modification descriptor units, each of the duration modification descriptor units corresponding to at least one of the plurality of acoustic units and specifying a time duration of the corresponding acoustic unit.

28. The computing device of claim 27, wherein the intermediate form representation includes:

acoustic gain modification descriptor units, each of the acoustic gain modification descriptor units corresponding to the at least one of the plurality of acoustic units and specifying an amplitude gain that is to be applied to the corresponding acoustic unit.

29. The computing device of claim 28, wherein the intermediate form representation includes:

acoustic gain modification descriptor units, each of the acoustic gain modification descriptor units corresponding to the at least one of the plurality of acoustic units and specifying an amplitude gain that is to be applied to the corresponding acoustic unit.

30. The computing device of claim 29, wherein the intermediate form representation includes:

spectral tilt modification descriptor units, each of the spectral tilt modification descriptor units corresponding to the at least one of the plurality of acoustic units and specifying a target slope of a formant spectral envelope of the corresponding acoustic unit.

* * * * *